(12) United States Patent
Gara et al.

(10) Patent No.: US 8,473,683 B2
(45) Date of Patent: Jun. 25, 2013

(54) ORDERING OF GUARDED AND UNGUARDED STORES FOR NO-SYNC I/O

(75) Inventors: Alan Gara, Mount Kisco, NY (US); Martin Ohmacht, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 12/986,349

(22) Filed: Jan. 7, 2011

(65) Prior Publication Data

US 2011/0173394 A1 Jul. 14, 2011

Related U.S. Application Data

(60) Provisional application No. 61/293,237, filed on Jan. 8, 2010.

(51) Int. Cl.
*G06F 12/12* (2006.01)
(52) U.S. Cl.
USPC ............... 711/125; 711/133; 711/E12.02
(58) Field of Classification Search
USPC ................................................ 711/125, 133
See application file for complete search history.

(56) References Cited

U.S. PATENT DOCUMENTS

| 7,249,229 B2 * | 7/2007 | Ogasawara et al. | 711/154 |
| 2006/0085603 A1 * | 4/2006 | Guthrie et al. | 711/141 |
| 2009/0300338 A1 * | 12/2009 | Caprioli et al. | 712/228 |

* cited by examiner

*Primary Examiner* — Kenneth Lo
(74) *Attorney, Agent, or Firm* — Scully, Scott, Murphy & Presser, P.C.; Daniel P. Morris, Esq.

(57) ABSTRACT

A parallel computing system processes at least one store instruction. A first processor core issues a store instruction. A first queue, associated with the first processor core, stores the store instruction. A second queue, associated with a first local cache memory device of the first processor core, stores the store instruction. The first processor core updates first data in the first local cache memory device according to the store instruction. The third queue, associated with at least one shared cache memory device, stores the store instruction. The first processor core invalidates second data, associated with the store instruction, in the at least one shared cache memory. The first processor core invalidates third data, associated with the store instruction, in other local cache memory devices of other processor cores. The first processor core flushing only the first queue.

25 Claims, 5 Drawing Sheets

ORDERING OF GUARDED AND UNGUARDED STORES FOR NO-SYNC I/O

CROSS-REFERENCE TO RELATED APPLICATIONS

This application is a non-provisional of U.S. Patent Application Ser. No. 61/293,237, filed Jan. 8, 2010 the entire content and disclosure of which is incorporated herein by reference. The present invention is related to the following commonly-owned, co-pending U.S. patent applications, the entire contents and disclosure of each of which is expressly incorporated by reference herein as if fully set forth herein. U.S. patent application Ser. No. 12/684,367, filed Jan. 8, 2010, for "USING DMA FOR COPYING PERFORMANCE COUNTER DATA TO MEMORY"; U.S. patent application Ser. No. 21/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010, for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010, for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed Feb. 1, 2010, which claims the benefit of the filing date of U.S. provisional application Ser. No. 61/293,611, filed Jan. 8, 2010 for "CONDITIONAL LOAD AND STORE IN A SHARED CACHE"; U.S. patent application Ser. No. 12,684,738, filed Jan. 8, 2010 for "DISTRIBUTED PERFORMANCE COUNTERS"; U.S. patent application Ser. No. 61/261,269, filed Nov. 13, 2009, for "LOCAL ROLLBACK FOR FAULT-TOLERANCE IN PARALLEL COMPUTING SYSTEMS"; U.S. patent application Ser. No. 12/684,860, filed Jan. 8, 2010, for "PAUSING AND ACTIVATING THREAD STATE UPON PIN ASSERTION BY EXTERNAL LOGIC MONITORING POLLING LOOP EXIT TIME CONDITION"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "OPTIMIZING TLB ENTRIES FOR MIXED PAGE SIZE STORAGE IN CONTIGUOUS MEMORY"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/295,669, filed Jan. 15, 2010, which claims the benefit of the filing date of U.S. provisional application Ser. No. 61/293,611, filed Jan. 8, 2010 for "CACHE DIRECTORY LOOKUP READER SET ENCODING FOR PARTIAL CACHE LINE SPECULATION SUPPORT"; U.S. patent application Ser. No. 12/693,972, filed Jan. 26, 2010, which claims the benefit of the filing date of U.S. provisional application Ser. No. 61/293,611, filed Jan. 8, 2010 for "DISTRIBUTED PARALLEL MESSAGING FOR MULTIPROCESSOR SYSTEMS"; U.S. patent application Ser. No. 12/688,747, filed Jan. 15, 2010, which claims the benefit of the filing date of U.S. provisional application Ser. No. 61/293,611, filed Jan. 8, 2010, for "SUPPORT FOR NON-LOCKING PARALLEL RECEPTION OF PACKETS BELONGING TO A SINGLE MEMORY RECEPTION FIFO"; U.S. patent application Ser. No. 12/688,773, filed Jan. 15, 2010, which claims the benefit of the filing date of U.S. provisional application ser. No. 61/293,611, filed Jan. 8, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 61/293,611, filed Jan. 8, 2010, for "A MULTI-PETASCALE HIGHLY EFFICIENT PARALLEL SUPERCOMPUTER"; U.S. patent application Ser. No. 12/984,252, filed Jan. 4, 2011, which claims the benefit of the filing date of U.S. provisional application Ser. No. 61/293,611, filed Jan. 8, 2010, for "CACHE WITHIN A CACHE"; U.S. patent application Ser. No. 61/299,911, filed Jan. 29, 2010, which claims the benefit of the filing date of U.S. provisional application Ser. No. 61/293,611, filed Jan. 8, 2010, for "SPECULATION AND TRANSACTION IN A SYSTEM SPECULATION AND TRANSACTION SUPPORT IN L2L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,583, filed Jan. 18, 2011, which claims benefit of U.S. provisional application Ser. No. 61/299,911, filed Jan. 29, 2010, for "READER SET ENCODING FOR DIRECTORY OF SHARED CACHE MEMORY IN MULTIPROCESSOR SYSTEM"; U.S. patent application Ser. No. 12/984,308, filed Jan. 4, 2011, which claims the benefit of the filing date of U.S. provisional application Ser. No. 61/293,266, filed Jan. 8, 2010 and claims the benefit of the filing date of U.S. provisional application Ser. No. 61/293,611, filed Jan. 8, 2010, for "EVICT ON WRITE, A MANAGEMENT STRATEGY FOR A PREFETCH UNIT AND/OR FIRST LEVEL CACHE IN A MULTIPROCESSOR SYSTEM WITHIN SPECULATIVE EXECUTION"; U.S. patent application Ser. No. 12/984,329, filed Jan. 4, 2011, which claims the benefit of the filing date of U.S. provisional application Ser. No. 61/293,266, filed Jan. 8, 2010 and claims the benefit of the filing date of U.S. provisional application Ser. No. 61/293,611, filed Jan. 8, 2010, for "PHYSICAL ALIASING FOR THREAD LEVEL SPECULATION WITHIN A SPECULATION BLIND CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed by Jan. 8, 2010, for "FLASH MEMORY FOR CHECKPOINT STORAGE"; U.S. patent application Ser. No. 61/293,476, filed Jan. 8, 2010 for "NETWORK SUPPORT FOR SYSTEM INITIATED CHECKPOINTS"; U.S. patent application Ser. No. 61/293,554, filed Jan. 8, 2010, for "TWO DIFFERENT PREFETCH COMPLEMENTARY ENGINES OPERATING SIMULTANEOUSLY"; U.S. patent application Ser. No. 12/697,015, filed Jan. 29, 2010, which claims the benefit of the filing date of U.S. provisional application Ser. No. 61/293,611, filed Jan. 8, 2020, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-

CHIP BY PREDICTIVE WEAR-OUT BASED ACTIVATION OF FUNCTIONAL COMPONENTS"; U.S. patent application Ser. No. 61/293,569, filed Jan. 8, 2010, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, filed Jan. 29, 2010, which claims the benefit of the filing date of U.S. provisional application Ser. No. 61/293,611, filed Jan. 8, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, which claims benefit of U.S. provisional application Ser. No. 61/299,911, filed Jan. 29, 2010, for "ATOMICITY: A MULTI-PRONGED APPROACH"; U.S. patent application Ser. No. 12/697,175, filed Jan. 29, 2010, which claims benefit of U.S. provisional application Ser. No. 61/293,611, filed Jan. 8, 2010, for "I/O ROUTING IN A MULTIDIMENSIONAL TORUS NETWORK"; U.S. patent application Ser. No. 12/684,287, filed Jan. 8, 2010 for ARBITRATION IN CROSSBAR FOR LOW LATENCY; U.S. patent application Ser. No. 12/684,630, filed Jan. 8, 2010 for EAGER PROTOCOL ON A CACHE PIPELINE DATAFLOW; U.S. patent application Ser. No. 12/723,277, filed Mar. 12, 2010, which claims the benefit of the filing date of U.S. provisional application Ser. No. 61,293,611, filed Jan. 8, 2010 for EMBEDDED GLOBAL BARRIER AND COLLECTIVE IN A TORUS NETWORK; U.S. patent application Ser. No. 61/293,499, filed Jan. 8, 2010 for GLOBAL SYNCHRONIZATION OF PARALLEL PROCESSORS USING CLOCK PULSE WIDTH MODULATION; U.S. patent application Ser. No. 61/293,266, filed Jan. 8, 2010 for IMPLEMENTATION OF MSYNC; U.S. patent application Ser. No. 12/796,389, filed Jun. 8, 2010, which claims the benefit of the filing date of U.S. provisional application Ser. No. 61/293,611, filed Jan. 8, 2010 for BALANCING WORKLOAD IN A MULTIPROCESSOR SYSTEM RESPONSIVE TO PROGRAMMABLE ADJUSTMENTS IN SYNCRONIZATION INSTRUCTION; U.S. patent application Ser. No. 12/696,817, filed Jan. 29, 2010, which claims the benefit of the filing date of U.S. provisional application Ser. No. 61/293,611, filed Jan. 8, 2010 for for HEAP/STACK GUARD PAGES USING A WAKEUP UNIT; U.S. patent application Ser. No. 61/293,603, filed Jan. 8, 2010 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 61/299,918, filed Jan. 29, 2010, which claims the benefit of the filing date of U.S. provisional application Ser. No. 61/293,611, filed Jan. 8, 2010 for REPRODUCIBILITY IN A MULTIPROCESSOR SYSTEM.

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

BACKGROUND

The present invention generally relates to a parallel computing system. More particularly, the present invention relates to processing a store instruction in the parallel computing system.

A store instruction refers to an instruction issued by a processor core, e.g., in a parallel computing system, for storing a content of a register into a memory location. The store instruction specifies the memory location where the content is to be written. Under a strong consistency model, a processor core issues a store instruction. The issued store instruction is visible to other processor cores. Updates through store instructions are processed in their issued order. In other words, a first issued store instruction is processed first, a second issued store instruction is processed second, and so on.

Under a weak consistency model, processor cores issues store instructions in an arbitrary order. A processor core does not need to wait to issue a store instruction. Processor cores can issue store instructions out of order. In this weak consistency model, after a processor core issues a store instruction, this processor core sets a flag bit on data in a shared main memory device and/or shared cache memory device being updated by the store instruction. Other processor cores can see this flag bit set. However, this flag bit set does not guarantee that the data associated with the flag bit is valid. Thus, to validate data and/or synchronize issued store instructions, a processor core issues a synchronization instruction called msync instruction which ensures store instructions issued be processed in their issued order. The msync instruction ensures in order processing of issued store instructions. After running the msync instruction, other cores access data updated by the store instruction(s). However, the msync instruction is an expensive instruction, i.e., takes more than 100 clock cycles.

Therefore, it is highly desirable to allow out of order issuance of store instructions and process the store instructions in a parallel computing system without using the msync instruction.

SUMMARY OF THE INVENTION

The present invention describes a system, method and computer program product for allowing out of order issuance of store instructions and processing the store instructions in a parallel computing system without using the msync instruction or similar synchronization instructions as would be issued in such system.

In one embodiment, there is provided a computer-implemented method for processing at least one store instruction in a parallel computing system including a plurality of computing node, a computing node including a plurality of processor cores and at least one shared cache memory device, a processor core having at least one local cache memory device, the method comprising:

receiving the at least one store instruction from a first processor core;

storing the at least one store instruction in a first queue associated with the first processor core;

storing the at least one store instruction in a second queue associated with a first local cache memory device of the first processor core;

updating first data in the first local cache memory device according to the at least one store instruction;

storing the at least one store instruction in a third queue associated with the at least one shared cache memory device;

invalidating second data in the at least one shared cache memory, the second data associated with the at least one store instruction;

invalidating third data in other local cache memory devices associated with other processor cores, the third data associated with the at least one store instruction; and flushing only the first queue.

In one embodiment, there is provided a parallel computing system for processing at least one store instruction in a plurality of computing node, a computing node including a plurality of processor cores and at least one shared cache memory device, a processor core having at least one local cache memory device, the system comprising:

a first processor core issuing the at least one store instruction;

a first queue, associated with the first processor core, storing the at least one store instruction;

a second queue, associated with a first local cache memory device of the first processor core, storing the at least one store instruction;

the first processor core updating first data in the first local cache memory device according to the at least one store instruction;

a third queue, associated with the at least one shared cache memory device, storing the at least one store instruction;

the first processor core invalidating second data in the at least one shared cache memory, the second data associated with the at least one store instruction;

the first processor core invalidating third data in other local cache memory devices associated with other processor cores, the third data associated with the at least one store instruction; and the first processor core flushing only the first queue.

In a further embodiment, the parallel computing system further comprises:

a fourth queue, associated with a second processor core, storing the at least one store instruction, the second processor core not having the at least one local cache memory device.

In a further embodiment, the first processor core sets a flag bit on the updated first data after the updating.

In a further embodiment, the set flag bit validates the updated first data.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

Figure 1:
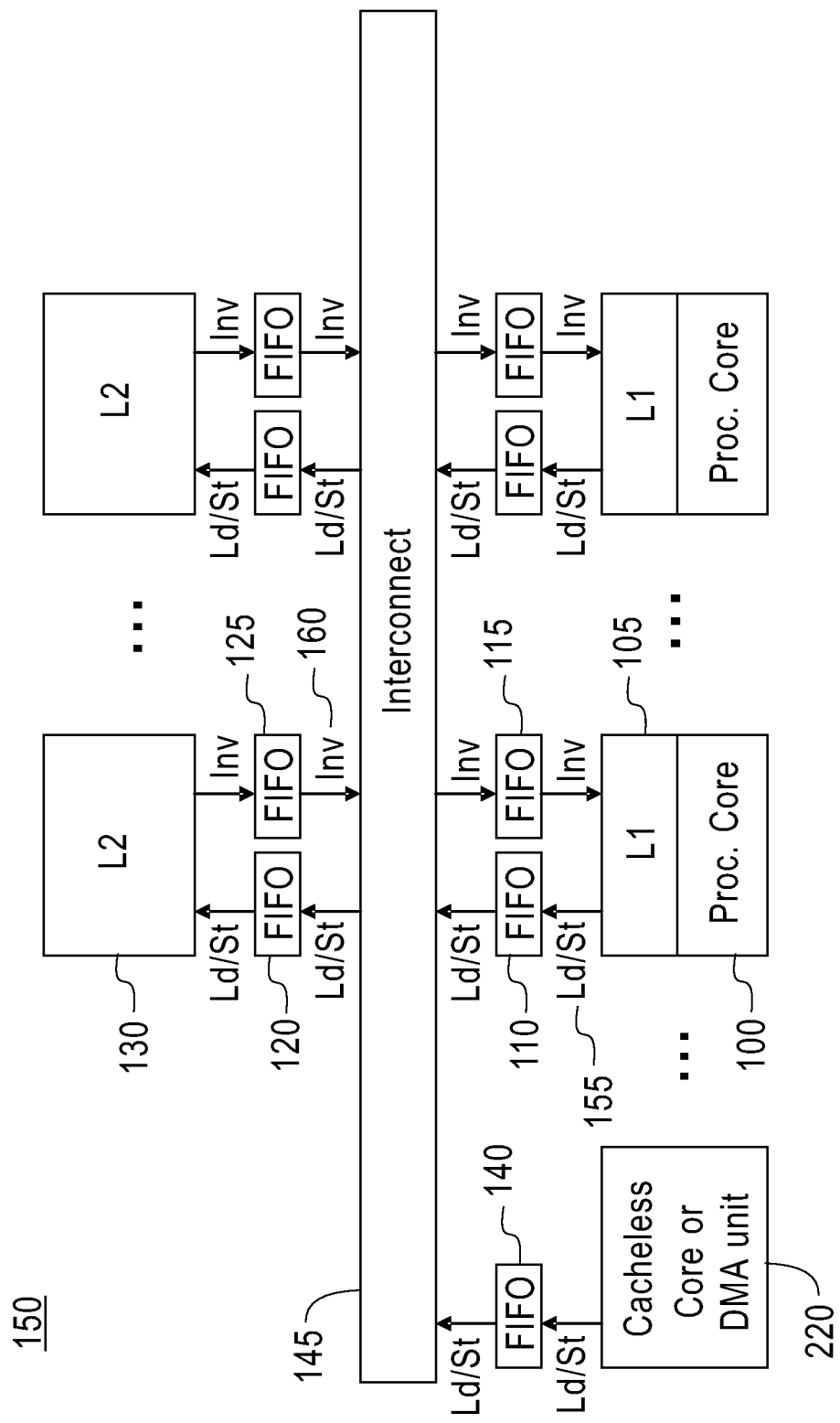
FIG. 1 illustrates a parallel computing system in one embodiment.

FIG. 1 illustrates a computing node 150 of a parallel computing system (e.g., IBM® Blue Gene® L/P/Q, etc.) in one embodiment. The computing node 150 includes, but is not limited to: a plurality of processor cores (e.g., a processor core 100), a plurality of local cache memory devices (e.g., L1 (Level 1) cache memory device 105) associated with the processor cores, a plurality of first request queues (not shown) located at output ports of the processor cores, a plurality of second request queues (e.g., FIFOs (First In First Out queues) 110 and 115) associated with the local cache memory devices, a plurality of shared cache memory devices (e.g., L2 (Level 2) cache memory device 130), a plurality of third request queues (e.g., FIFOs 120 and 125) associated with the shared cache memory devices, a messaging unit (MU) 220 that includes DMA capability, at least one fourth request queue (e.g., FIFO 140) associated with the messaging unit 220, and a switch 145 connecting the FIFOs. A processor core may be a single processor unit such as IBM® PowerPC® or Intel® Pentium. There may be at least one local cache memory device per a processor core. In a further embodiment, a processor core may include at least one local cache memory device. A request queue includes load instructions (i.e., instructions for loading a content of a memory location to a register) and store instructions and other requests (e.g., prefetch request). A request queue may be implemented as an FIFO (First In First Out) queue. Alternatively, a request queue is implemented as a memory buffer operating (i.e., inputting and outputting) out-of-order (i.e., operating regardless of an order). In a further embodiment, a local cache memory device (e.g., L1 cache memory device 105) includes at least two second request queues (e.g., FIFOs 110 and 115). An FIFO (First In First Out) is a storage device that holds requests (e.g., load instructions and/store instructions) and coherence management operation (e.g., an operation for invalidating speculative and/or invalid data stored in a local cache memory device associated with that FIFO). A shared cache memory device may include third request queues (e.g., FIFOs 120 and 125). In a further embodiment, the messaging unit (MU) 220 is a processing core that does not include a local cache memory device. The messaging unit 220 is described in detail below in conjunction with FIGS. 2-3. In one embodiment, the switch 145 implemented as a crossbar switch. The switch may be implemented as an optical and reconfigurable crossbar switch. In one embodiment, the switch is unbuffered, i.e., the switch cannot store requests (e.g., load and store instructions) or invalidations (i.e., operations or instructions for invalidating of requests or data) but transfer these requests and invalidations in a predetermined amount of cycles between processor cores. In an alternative embodiment, the switch 145 includes at least one internal buffer that may hold the requests and coherence management operations (e.g., an operation invalidating a request and/or data). The buffered switch 145 can hold the requests and operations for a period time (e.g., 1,000 clock cycles) even without a limit of how long the switch 145 can hold the requests and operations.

In FIG. 1, an arrow labeled Ld/St (Load/Store) (e.g., an arrow 155) is a request from a processor core to the at least one shared cache memory device (e.g., L2 cache memory device 130). The request includes, but is not limited to: a load instruction, a store instruction, a prefetch request, an atomic update (e.g., an operation for updating registers), cache line locking, etc. An arrow labeled Inv (e.g., an arrow 160) is a coherence management operation that invalidates data in the at least one local cache memory device (e.g., L1 cache memory device 105). The coherence management operation includes, but is not limited to: an ownership notification (i.e., a notification claiming an ownership of a datum held in the at least one local cache memory device), a flush request (i.e., a request draining a queue), etc.

Figure 2:
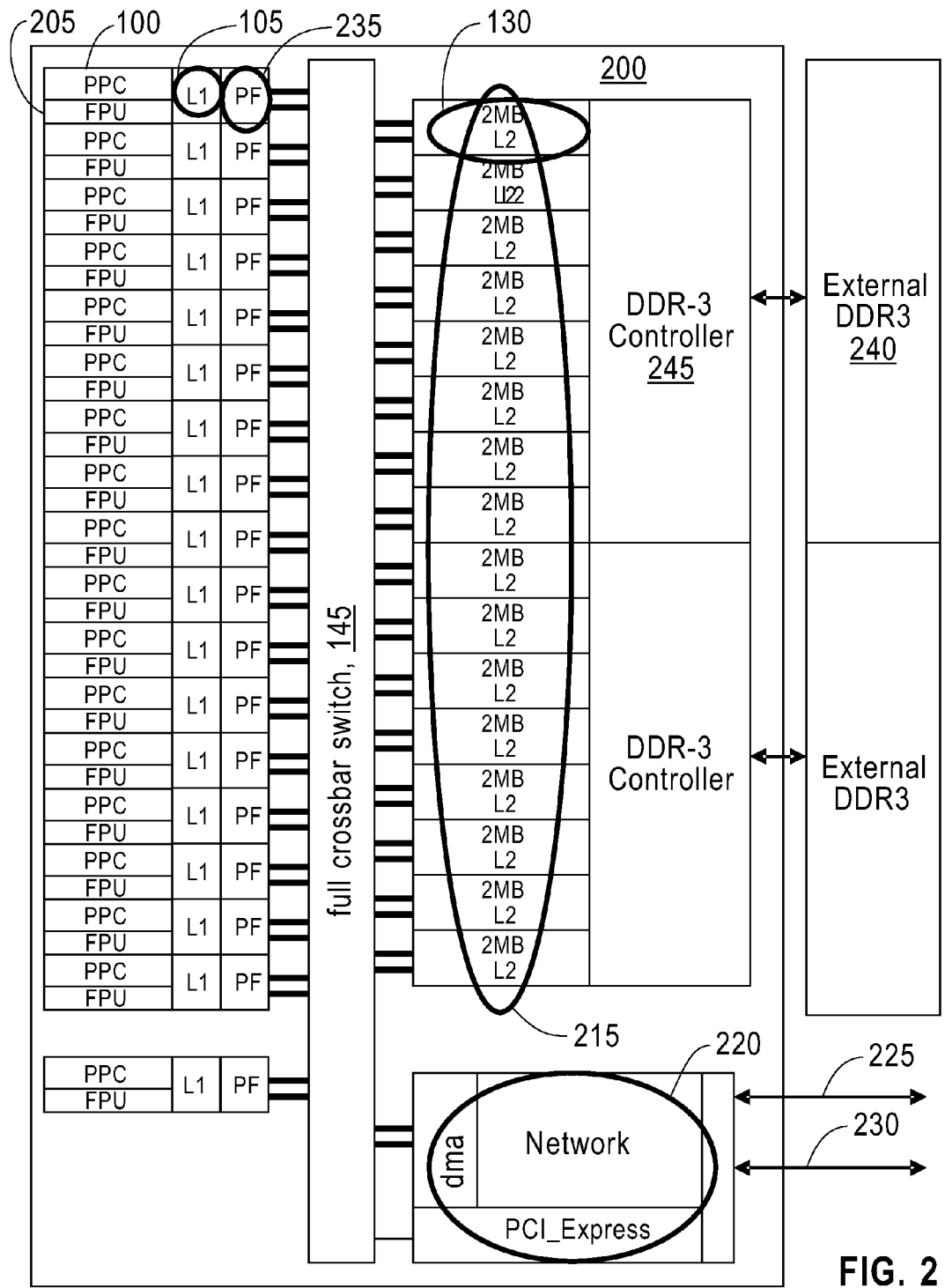
FIG. 2 illustrates a parallel computing system in a further embodiment.

FIG. 2 illustrates the computing node 150 in a further embodiment. In this embodiment, the use of the letter "B" represents a Byte quantity, e.g., 2B, 8.0B, 32B, and 64B. Recitations "GB" represent Gigabyte quantities. A parallel computing system (e.g., IBM® Blue Gene®\Q, etc.) may include a plurality of computing nodes. For example, IBM® Blue Gene® \Q includes 1024 computing nodes. In this embodiment, a computing node 150 is a single chip based on low power processor cores (e.g., PowerPC® A2 cores working at 1600 MHz), though the computing node 150 can use any low power processor cores, and may comprise one or more semiconductor chips. In the embodiment depicted in FIG. 2, the node 150 includes at least sixteen low power processor cores (e.g., a processor core 100).

More particularly, the computing node 150 of the parallel computing system illustrated in FIG. 2 includes (sixteen or seventeen) 16+1 symmetric multiprocessing (SMP) cores (e.g., a processor core 100), each core being 4-way hardware threaded supporting transactional memory and thread level speculation, and, including a Quad Floating Point Unit (FPU) 205 on each core (204.8 GF peak node). In one implementation, the core 100 operating frequency target is 1.6 GHz providing, for example, a 563 GB/s bisection bandwidth to shared L2 cache memory device 215 via a full crossbar switch 145. In one embodiment, there is provided 32 MB of shared L2 cache memory device 215, each core having associated 2 MB (130) of the shared L2 cache memory device 215. There is further provided external DDR SDRAM (e.g., Double Data Rate synchronous dynamic random access) memory device 240, as a lower level in the memory hierarchy in communication with the shared L2 cache memory device 215. In one embodiment, the computing node 150 includes 42.6 GB/s DDR3 bandwidth (1.333 GHz DDR3) (2 channels each with chip kill protection).

In one embodiment, each FPU 205 associated with a processor core 100 has a 32B wide data path to at least one local L1 cache memory device 105, allowing the processor core 100 to load or store 32B per cycle from or into the local cache memory device 105. Each core 100 is directly connected to a prefetch unit (level-1 prefetch, L1P) 235, which accepts, decodes and dispatches all requests sent out by the core 100. The store interface from the core 100 to the at least one local cache memory device 105 is 32B wide and the load interface is 16B wide, both operating at processor frequency. The at least one local cache memory device 105 implements a fully associative, 32 entry prefetch buffer. Each entry can hold an L2 cache line of 128B size in one exemplary embodiment. The at least one local cache memory device 105 provides two prefetching schemes for the prefetch unit 235: a sequential prefetcher as used in previous Blue Gene® architecture generations, as well as a list prefetcher.

As shown in FIG. 2, the 32MiB shared L2 cache memory device may be sliced into 16 units, each connecting to a slave port of the switch 145. Every physical address is mapped to one slice using a selection of programmable address bits or a XOR-based hash across all address bits. The L2 cache slices and the at least one local cache memory device of the cores are hardware-coherent. A group of 4 L2 cache slices is connected via a ring to one of the two DDR3 SDRAM controllers 245.

By implementing a direct memory access engine referred to herein as a Messaging Unit, "MU" such as MU 220, with each MU including a DMA engine and Network Card interface in communication with the XBAR switch 145, chip I/O functionality is provided. In one embodiment, the MU 220 further includes, in a non-limiting example: 10 intra-rack interprocessor links 225, each at 2.0 GB/s, for example, i.e., 10*2 GB/s intra-rack & inter-rack (e.g., configurable as a 5-D torus in one embodiment); and, one I/O link 230 interfaced with the MU 220 at 2.0 GB/s (2 GB/s I/O link (to I/O subsystem)) is additionally provided. The MU 220 employs or is associated and interfaced with a 8-16 GB memory/node. The MU 220 may consume up to about 30 watts chip power.

Although not shown in FIG. 2, each processor core 100 has associated a quad-wide fused multiply-add SIMD (Single Instruction Multiple Data) floating point unit, producing 8 double precision operations per cycle, for a total of 128 floating point operations per cycle per computing node. A processor core 100 is a 4-way multi-threaded 64 bit PowerPC® implementation. Each processor core 100 has its own computing unit (XU), instruction unit (IU), and quad floating point unit (QPU) connected via the AXU (Auxiliary Computing Unit). The QPU is an implementation of the 4-way SIMD QPX floating point instruction set architecture. QPX is an extension of the scalar PowerPC® floating point architecture. It defines 32 32B-wide floating point registers per thread instead of the traditional 32 scalar 8B-wide floating point registers.

Figure 3:
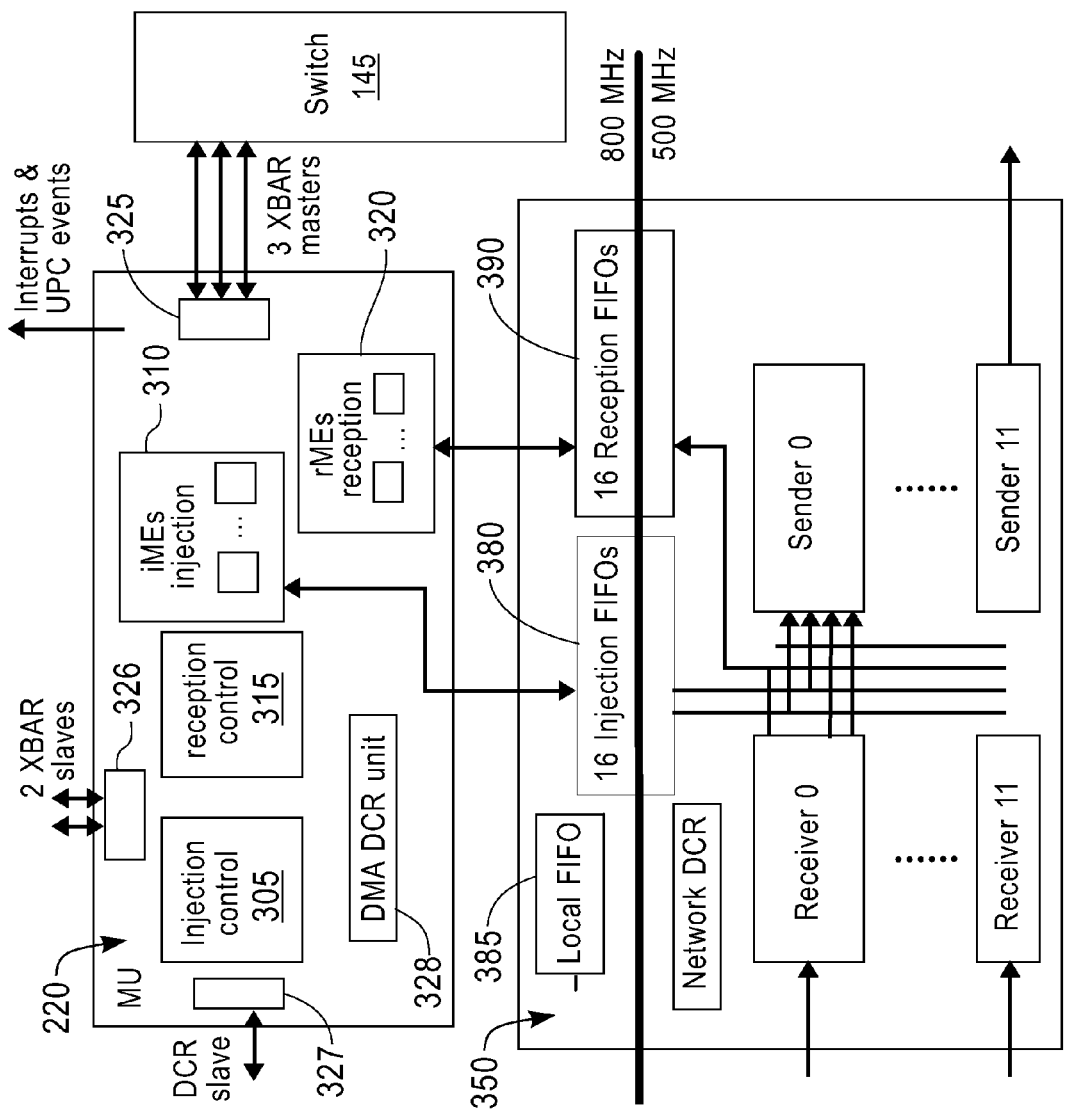
FIG. 3 illustrates a messaging unit in one embodiment.

FIG. 3 illustrates a Messaging Unit (MU) 220 in one embodiment. The computing node 150 implements a direct memory access engine referred to herein as a Messaging Unit, "MU" such as MU 220 to offload the network interface. It transfers blocks via three switch master ports between the shared L2 cache memory devices 215 (FIG. 2) and the reception FIFOs 390 and transmission FIFOs 380 of the network interface 350. The network interface 350 is controlled by the cores via memory mapped I/O access through an additional switch slave port.

In one embodiment, one function of the MU 220 is to ensure optimal data movement to, and from a network into a local memory system. It supports injection and reception of messages, as well as data prefetching into the memory, and on-chip memory copy. On the injection side, the MU 220 splits and packages messages into network packets, and sends packets to the network respecting a network protocol (e.g., HTTP, TCP/IP, SMTP, etc.). On packet injection, the MU 220 distinguishes between packet injection and memory prefetching packets. A memory prefetch mode is supported in which the MU 220 fetches a message into the shared L2 cache memory device 215, but does not send it. On the reception side, it receives network packets, and writes them into an appropriate location in the shared L2 cache memory device 215, depending on the network protocol. On packet reception, the MU 220 distinguishes between three different types of packets and accordingly performs different operations. The types of packets supported are: memory FIFO packets, direct put packets, and remote get packets. If the packet is a direct put packet, payload bytes of the packet are placed into a memory location starting at an address indicated in the packet. If a packet belongs to a memory FIFO packet, the packet is placed at the tail of a reception FIFO 390 and then the MU 220 updates the tail. If a packet is a remote get packet, a payload of such packet is a message descriptor that is put into an injection FIFO 380.

The MU 220 also supports local cache memory copy, where the MU copies an area in a local cache memory to another area in that local cache memory. For memory-to-memory on chip data transfer, a dedicated SRAM buffer, located in the network device, is used. Remote gets and the corresponding direct puts can be "paced" by software to reduce contention within the network. In this software-controlled paced mode, a remote get for a long message is broken up into multiple remote gets, each for a sub-message. The sub-message remote get is only allowed to enter the network if the number of packets belonging to the paced remote get active in the network is less than an allowed threshold. Software has to carefully control the pacing, otherwise deadlocks can occur.

The top level architecture of the Messaging Unit 100 interfacing with the Network interface Device (ND) 350 is shown in FIG. 3. The Messaging Unit 220 functional blocks involved with injection control as shown in FIG. 3 includes the following: Injection control units 305 implementing logic for queuing and arbitrating the processors' requests to the control areas of an injection MU; Reception control units 315 Implementing logic for queuing and arbitrating the requests to the control areas of a reception MU; Injection iMEs (injection Message Elements) 310 that reads data from L2 cache or DDR memory and inserts it in the network injection FIFOs 380, or in the local copy FIFO 385. Reception rMEs (reception Message Elements) 320 that reads data from the network reception FIFOs 390, and inserts them into L2. In one embodiment, there are 16 rMEs 320, one for each network reception FIFO. A DCR Unit 128 is provided that includes DCR registers for the MU 220.

The MU 220 further includes an Interface to a cross-bar switch (XBAR) switch 145 (or SerDes) switches in additional implementations. The MU 220 operates at clock/2 (e.g., 800 MHz). The Network Device 350 operates at 500 MHz (e.g., 2 GB/s network). The MU 220 includes three (3) Xbar masters 325 to sustain network traffic and two (2) Xbar slaves 326 for programming. A DCR slave interface unit 327 is also provided.

The handover between network device 350 and MU 220 is performed via 2-port SRAMs for network injection/reception FIFOs. The MU 220 reads/writes one port using, for example, an 800 MHz clock, and the network reads/writes the second port with a 500 MHz clock. The only handovers are through the FIFOs and FIFOs' pointers (which are implemented using latches).

Figure 4:
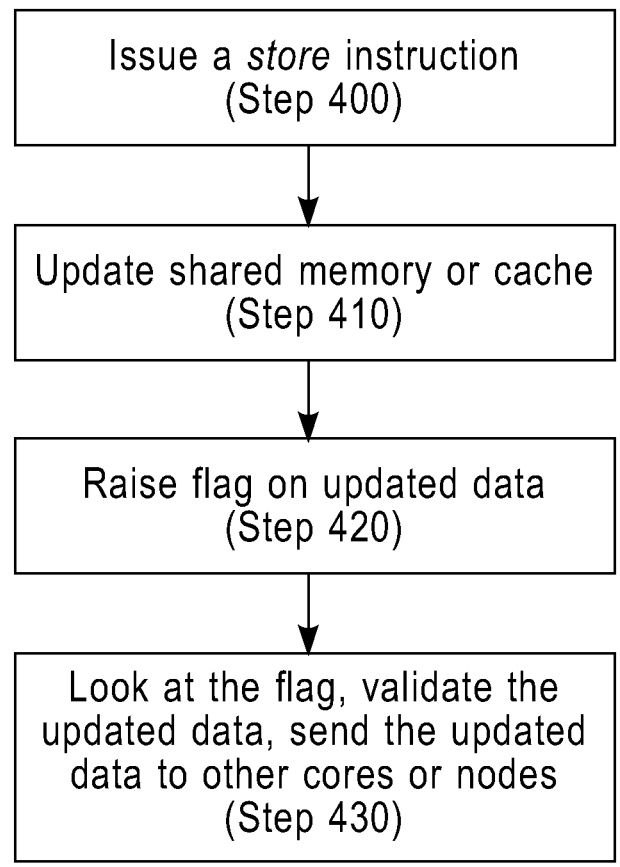
FIG. 4 illustrates a flow chart including method steps for processing store instructions in one embodiment.

FIG. 4 illustrates a flow chart describing method steps for processing at least one store instruction in one embodiment. The computing node 150 allows out-of-order issuances of store instructions by processing cores and/or guarantees in-order processing the issued store instructions, e.g., by running method steps 400-430 in FIG. 4. At step 400, a processor core of a computing node issues a store instruction. At step 410, the processor core updates the shared cache memory device 215 according to the issued store instruction. For example, the processor core overwrites data in a certain cache line of the shared cache memory device 215 which corresponds to a memory address or location included in the store instruction. At step 420, processor core sets a flag bit on data in the shared cache memory device 215 updated by the store instruction. In this embodiment, the flag bit indicates whether corresponding data is valid or not. In a further embodiment, a position of flag bit in data is pre-determined. At step 430, the MU 220 looks at the flag bit based on a memory location or address specified in the store instruction, validates the updated data if determined that the flag bit on the updated data is set, and sends the updated data to other processor cores or other computing nodes that the MU does not belong to. In one embodiment, the MU 220 monitors load instructions and store instructions issued by processor cores, e.g., by accessing an instruction queue.

In one embodiment, a processor core issued the store instruction is a producer (i.e., a component producing or generating data). That processor core hands off the produced or generated data to, e.g., a register in, the MU 220 (FIGS. 1-3) which is another processor core having no local cache memory device. Thus, in this embodiment, the MU 220 is a consumer (i.e., a component receiving data from the producer).

In one embodiment, other processor cores access the updated data upon seeing the flag bit set, e.g., by accessing the updated data by using a load instruction specifying a memory location of the updated data. The store instruction may be a guarded store instruction or an unguarded store instruction. The guarded store instruction is not processed speculatively and/or run when its operation is guaranteed safe. The unguarded store instruction is processed speculatively and/or assumes no side effect (e.g., speculatively overwriting data in a memory location does not affect a true output) in accessing the shared cache memory device 215. The parallel computing system run the method steps 400-430 without an assistance of a synchronization instruction (e.g., mysnc instruction).

Figure 5:
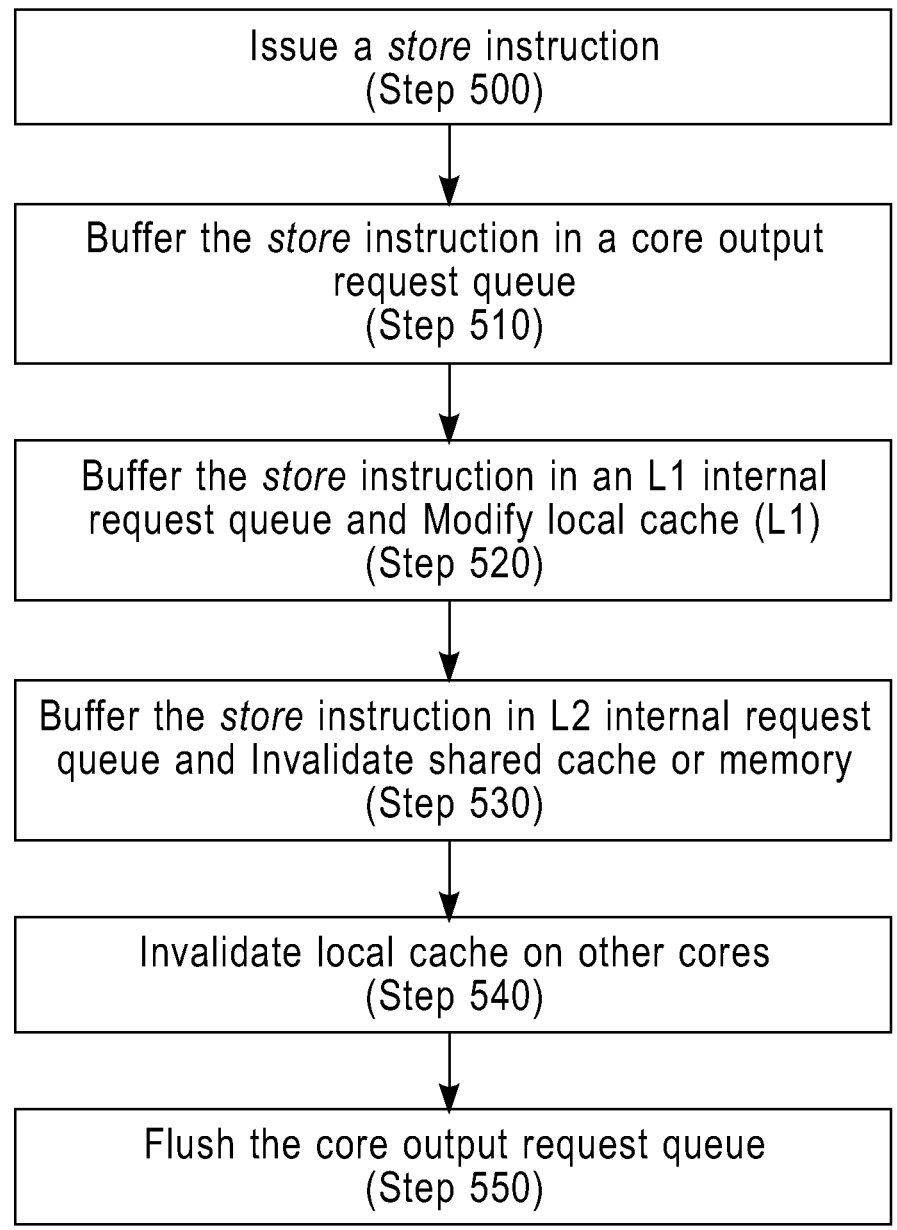
FIG. 5 illustrates another flow chart including method steps for processing store instructions in one embodiment.

FIG. 5 illustrates a flow chart for processing at least one store instruction in a parallel computing system in one embodiment. The parallel computing system may include a plurality of computing nodes. A computing node may include a plurality of processor cores and at least one shared cache memory device. The computing node allows out-of-order issuances of store instructions by processing cores and/or guarantees in-order processing of the issued store instructions, e.g., by running method steps 500-550 in FIG. 5. A first processor core (e.g., a processor core 100 in FIGS. 1-2) may include at least one local cache memory device. At step 500, a processor core issues a store instruction. At step 510, a first request queue associated with the processor core receives and stores the issued store instruction. In one embodiment, the first request queue is located at an output port of the first processor core. At step 520, a second request queue, associated with at least one local cache memory device of the first processor core, receives and stores the issued store instruction from the first processor core. In one embodiment, the second request queue is an internal queue or buffer of the at least one local cache memory device 105. The first processor core updates data in its local cache memory device 105 (i.e., the at least one local cache memory device of the first processor core) according to the store instruction. At step 530, a third request queue, associated with the shared cache memory device, receives and stores the store instruction from the first processor core, the first request queue or the second request queue. In one embodiment, the third request queue is an internal queue or buffer of the shared cache memory device 215.

At step 540 in FIG. 5, the first processor core invalidates data, e.g., by unsetting a valid bit associated with that data, in the shared cache memory device 215 associated with the store instruction. The first processor core may also invalidate data, e.g., by unsetting a valid bit associated with that data, in other local cache memory device(s) of other processor core(s) associated with the store instruction. At step 550, the first processor core flushes the first request queue. The first processor does not flush other request queues. Thus, the parallel computing system allows the other request queues (i.e., request queues not flushed) to hold invalid requests (e.g., invalid store or load instruction). In this embodiment described in FIG. 5, the processor cores and MU 220 do not use a synchronization instruction (e.g., msync instruction issued by a processor core) to process store instructions. The synchronization instruction may flush all the queues.

In a further embodiment, a fourth request queue, associated with the MU 220, also receives and stores the issued store instruction. The first processor may not flush this fourth request queue when flushing the first request queue. The synchronization instruction issued by a processor core may flush this fourth request queue when flushing all other request queues.

In a further embodiment, the first, second, third and forth request queues concurrently receive the issued store instruction from the first processor core. Alternatively, the first, second, third and fourth request queues receive the issued store instruction in a sequential order.

In a further embodiment, some of the method steps described in FIG. 5 runs concurrently. The method steps described in FIG. 5 does not need to run sequentially as depicted in FIG. 5.

In one embodiment, the method steps in FIGS. 4-5 are implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the method steps in FIGS. 4-5 are implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip operates the method steps described in FIGS. 4-5.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for processing at least one store instruction in a parallel computing system including a plurality of computing node, a computing node including a plurality of processor cores and at least one shared cache memory device, a processor core having at least one local cache memory device, the method comprising:
    receiving the at least one store instruction from a first processor core;
    storing the at least one store instruction in a first queue associated with the first processor core;
    storing the at least one store instruction in a second queue associated with a first local cache memory device of the first processor core;
    updating first data in the first local cache memory device according to the at least one store instruction;
    storing the at least one store instruction in a third queue associated with the at least one shared cache memory device;
    invalidating second data in the at least one shared cache memory, the second data associated with the at least one store instruction;
    invalidating third data in other local cache memory devices associated with other processor cores, the third data associated with the at least one store instruction; and
    flushing only the first queue.

2. The computer-implemented method according to claim 1, wherein the at least one store instruction includes one or more of: a guarded store instruction and an unguarded store instruction.

3. The computer-implemented method according to claim 2, wherein the guarded store instruction is not processed speculatively.

4. The computer-implemented method according to claim 2, wherein the unguarded store instruction is processed speculatively.

5. The computer-implemented method according to claim 1, further comprising:

storing the at least one store instruction in a fourth queue associated with a second processor core, the second processor core not having the at least one local cache memory device.

6. The computer-implemented method according to claim 5, further comprising:
setting a flag bit on the updated first data after the updating.

7. The computer-implemented method according to claim 6, wherein the set flag bit validates the updated first data.

8. The computer-implemented method according to claim 7, wherein the second processor core sends the updated first data to nodes other than a node that the second processor core belongs to upon finding that the flag bit is set.

9. The computer-implemented method according to claim 5, wherein the parallel computing system does not use a synchronization instruction that flushes the first queue, second queue, third queue and fourth queue.

10. The computer-implemented method according to claim 1, wherein the parallel computing system allows the second queue, third queue or fourth queue includes an invalid store or load instruction.

11. A parallel computing system for processing at least one store instruction in a plurality of computing node, a computing node including a plurality of processor cores and at least one shared cache memory device, a processor core having at least one local cache memory device, the system comprising:
a first processor core issuing the at least one store instruction;
a first queue, associated with the first processor core, storing the at least one store instruction;
a second queue, associated with a first local cache memory device of the first processor core, storing the at least one store instruction;
the first processor core updating first data in the first local cache memory device according to the at least one store instruction;
a third queue, associated with the at least one shared cache memory device, storing the at least one store instruction;
the first processor core invalidating second data in the at least one shared cache memory, the second data associated with the at least one store instruction;
the first processor core invalidating third data in other local cache memory devices associated with other processor cores, the third data associated with the at least one store instruction; and
the first processor core flushing only the first queue.

12. The parallel computing system according to claim 11, wherein the at least one store instruction includes one or more of: a guarded store instruction and an unguarded store instruction.

13. The parallel computing system according to claim 12, wherein the guarded store instruction is not processed speculatively.

14. The parallel computing system according to claim 12, wherein the unguarded store instruction is processed speculatively.

15. The parallel computing system according to claim 11, further comprising:
a fourth queue, associated with a second processor core, storing the at least one store instruction, the second processor core not having the at least one local cache memory device.

16. The parallel computing system according to claim 15, wherein the first processor core sets a flag bit on the updated first data after the updating.

17. The parallel computing system according to claim 16, wherein the set flag bit validates the updated first data.

18. The parallel computing system according to claim 17, wherein the second processor core sends the updated first data to nodes other than a node that the second processor core belongs to upon finding that the flag bit is set.

19. The parallel computing system according to claim 15, wherein the first processor core, the second processor core and other processor cores do not use a synchronization instruction that flushes the first queue, second queue, third queue and fourth queue.

20. The parallel computing system according to claim 11, wherein the first processor core, the second processor core and other processor cores allows the second queue, third queue or fourth queue includes an invalid store or load instruction.

21. The computer-implemented system according to claim 11, further comprising:
a switch device transferring the at least one instruction from the first processor core to other processor cores.

22. The computer-implemented system according to claim 21, wherein the switch device has at least one internal buffer.

23. A computer program product for processing at least one store instruction in a parallel computing system including a plurality of computing node, a computing node including a plurality of processor cores and at least one shared cache memory device, a processor core having at least one local cache memory device, the computer program product comprising a storage medium readable by a processing circuit and storing instructions run by the processing circuit for performing a method according to claim 1.

24. A method of deploying a computer program product including a program of instructions in a computer readable medium for processing at least one store instruction in a parallel computing system including a plurality of computing node, a computing node including a plurality of processor cores and at least one shared cache memory device, a processor core having at least one local cache memory device, wherein, when the program of instructions are run by at least one processor, the computer program product performs the steps of claim 1.

25. The computer-implemented method according to claim 1, further comprising:
transferring the at least one instruction from the first processor core to other processor cores via a switch device.

* * * * *